United States Patent
Bertin et al.

(10) Patent No.: US 11,223,618 B2
(45) Date of Patent: Jan. 11, 2022

(54) CONTROL OF DELEGATION RIGHTS

(71) Applicant: Orange, Issy-les-Moulineaux (FR)

(72) Inventors: Emmanuel Bertin, Chatillon (FR);
Vincent Frey, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 271 days.

(21) Appl. No.: 16/338,285

(22) PCT Filed: Sep. 28, 2017

(86) PCT No.: PCT/FR2017/052638
§ 371 (c)(1),
(2) Date: Mar. 29, 2019

(87) PCT Pub. No.: WO2018/060629
PCT Pub. Date: Apr. 5, 2018

(65) Prior Publication Data
US 2020/0036706 A1      Jan. 30, 2020

(30) Foreign Application Priority Data

Sep. 30, 2016   (FR) ...................................... 1659437

(51) Int. Cl.
*G06F 21/00* (2013.01)
*H04L 29/06* (2006.01)
(Continued)

(52) U.S. Cl.
CPC .......... *H04L 63/0853* (2013.01); *G06F 21/34* (2013.01); *H04W 12/06* (2013.01); *H04W 12/08* (2013.01)

(58) Field of Classification Search
CPC .............................. H04L 63/0853; G06F 21/34
(Continued)

(56) References Cited

U.S. PATENT DOCUMENTS

| 8,826,390 B1 * | 9/2014 | Varda ................... G06F 21/6218 726/4 |
| 9,450,958 B1 * | 9/2016 | Saylor ................... H04L 63/102 |
| 2014/0379932 A1 * | 12/2014 | Bertin ..................... H04L 69/24 709/227 |

FOREIGN PATENT DOCUMENTS

| EP | 2858298 A1 | 4/2015 |
| WO | 2006079145 A1 | 8/2006 |

OTHER PUBLICATIONS

International Search Report dated Nov. 28, 2017 for International Publication No. PCT/FR2017/052638, filed Sep. 28, 2017.
(Continued)

*Primary Examiner* — Anthony D Brown
(74) *Attorney, Agent, or Firm* — David D. Brush; Westman, Champlin & Koehler, P.A.

(57) ABSTRACT

A method for controlling an action includes: receiving from a server an authorization request relating to at least one action for which a first user has execution rights, and for which a command has been formulated by a second user, the request containing data relating to the action and a delegation token certifying a delegation of the action by the first user to the second user; analyzing the request on the basis of the token; determining whether consent of the first user should be requested; sending to a terminal of the first user, a consent request and receiving a response; and sending to the server a response to the request relating to the action and signaling denial or consent.

9 Claims, 4 Drawing Sheets

(51) Int. Cl.
    *G06F 21/34*      (2013.01)
    *H04W 12/06*      (2021.01)
    *H04W 12/08*      (2021.01)

(58) Field of Classification Search
    USPC .......................................................... 726/4
    See application file for complete search history.

(56) References Cited

OTHER PUBLICATIONS

Written Opinion of the International Searching Authority dated Nov. 28, 2017 for International Publication No. PCT/FR2017/052638, filed Sep. 28, 2017.
English translation of the Written Opinion dated Apr. 2, 2019 for International Application No. PCT/FR2017/052638, filed Sep. 28, 2017.

* cited by examiner

CONTROL OF DELEGATION RIGHTS

CROSS-REFERENCE TO RELATED APPLICATIONS

This Application is a Section 371 National Stage Application of International Application No. PCT/FR2017/052638, filed Sep. 28, 2017, the content of which is incorporated herein by reference in its entirety, and published as WO 2018/060629 on Apr. 5, 2018, not in English.

FIELD OF THE DISCLOSURE

The invention is situated in the field of delegating rights of a person to a third party.

BACKGROUND OF THE DISCLOSURE

Numerous systems allow a user equipped with a computer apparatus to command the performance of actions, for example financial transactions, by way of a remote entity able to be reached via a communication link.

In these systems, an action is performed after verifying the identity and the rights of the user to perform this action.

Typically, this verification generally comprises the user inputting an identifier and a password that are recorded beforehand.

To bolster security, some systems also require the user to input a code generated by the system and transmitted to the user, via another communication network. This code is transmitted for example in the form of an SMS ("short message service") received by the mobile telephone of the user.

With the explosion of online transactions, and more generally online services, it may be necessary for a user to delegate the performance of certain actions to be performed to another person.

A first technique consists, for the user, in transmitting his identifiers to the person to whom he delegates access rights, in order for this person to perform the actions on his behalf. However, this solution may be hazardous for the user as he does not have control over the actions that are performed. In addition, if this person changes the password without communicating the new password to the user, the user is no longer able to perform the actions himself.

Another technique consists in addressing the administrator of each site so as to request that all or some of the access rights of a user be delegated to a designated person. However, this technique is burdensome and lacks flexibility.

SUMMARY

One of the aims of the invention is to remedy inadequacies/drawbacks of the prior art and/or to make improvements thereto.

To this end, the invention relates to a method for controlling an action.

According to the invention, the method includes the following steps, implemented by a control device:

receiving, from a server, an authorization request in relation to at least one action for which a first user has execution rights and for which a command has been formulated by a terminal of a second user, said request containing data in relation to said action and a delegation token certifying delegation of said at least one action by the first user to the second user, analyzing said request on the basis of the token so as to determine a first result;

determining so as to determine, on the basis of said first result, whether user consent should be requested;

sending, to a terminal of said first user, a consent request for the execution of said at least one action, if it is determined that user consent should be requested;

sending, to said server, a response to said authorization request signaling denial or consent for said at least one action, said response to the authorization request being obtained on the basis of a response to the consent request if a response to the consent request containing consent or denial is obtained by said device within a predetermined period or said response to the authorization request being said first result if not.

Even though the first user has delegated rights to the second user, he is able, by virtue of the consent request that he receives from the control device, to transmit consent or denial to execute an action commanded by a user who has received delegation. He thus keeps complete control over all of the delegated actions.

A delegation token is a dataset certifying delegation of an action of a first user to a second user. As is known, the delegation token generally contains open data and data encrypted with a ciphering key. Thus, on its own, a device authorized to verify the token has the key for verifying the validity of the token.

According to one particular embodiment of the method, the analysis step includes a verification step for determining whether a predefined set of at least one usage rule for said delegation token is complied with, and the step of sending a consent request is performed if said set of rules is not complied with.

A usage perimeter of the delegation is determined by predefined rules. The set of rules allows the first user in particular to limit delegated rights. However, if the rules are not complied with, interrogating and obtaining consent from the first user allows the second user to command the performance of an action for which he does not have delegation. This thus makes it possible to unburden the first user from performing actions for which he had not provided delegation.

This allows the second user to perform actions if the rights that were initially delegated to him do not allow him to perform this action. He is thus able to execute actions on behalf of the first user when the first user is not able to perform these actions himself, for example when the first user is away. However, these actions are subject to the control of the first user, who thus keeps control of these actions.

According to one particular embodiment of the method, the authorization request and the response to the authorization request are transmitted via a first communication network and the consent request is transmitted via a second communication network.

The use of a second network makes it possible in particular to reach the first user when he does not have access to the first network, for example when he is traveling.

According to one particular feature, the consent request is sent in the form of an SMS ("short message service"). This communication means is easy to use and non-invasive. The first user is thus able to give his consent without having to perform complicated manipulations.

According to one particular embodiment of the method, the authorization request includes a reachability identifier of the first user used to transmit said consent request.

A reachability identifier of a user is an identifier for contacting this user. Typically, a reachability identifier is a telephone number, an email address, etc.

The reachability identifier included in the authorization request allows the control server to reach the first user.

The provision of this reachability identifier by the second user in the action execution request allows flexibility in the choice of the terminal of the first user. The second user may for example use a first identifier in some conditions and a second one in other conditions. It is thus possible to provide a reachability identifier without modifying the setting of the control device.

This also makes it possible to bolster the security of the system. Specifically, providing a reachability identifier associated with a terminal that is not available for the first user leads to denial of the execution of the action if the usage rules are not complied with.

According to one particular embodiment, a reachability identifier is contained in the delegation token or recorded by the control device in a memory accessible to this control device. It is then not necessary to insert it into the authorization request. It is not necessary for the second user to transmit it in the request to execute an action.

According to one particular feature, at least one rule of said set is a rule associated with a usage context.

This allows better adaptability.

The invention also relates to a control device comprising:
a first communication module configured so as to receive, from a server, an authorization request in relation to at least one action for which a first user has execution rights and for which a command has been formulated by a terminal of a second user, said request containing data in relation to said at least one action and a delegation token certifying delegation of said at least one action by the first user to the second user,
a module for analyzing said request on the basis of the token so as to determine a first result;
a determination module for determining, on the basis of said first result, whether consent of the first user should be requested;
a second communication module configured so as to send, to a terminal of said first user, a consent request for the execution of said at least one action, if it is determined that consent of the first user should be requested;
a module for constructing a response to said authorization request signaling denial or consent for said at least one action, said response to the authorization request being obtained on the basis of a response to the consent request if a response to the consent request containing consent or denial is obtained by said device within a predetermined period or said response to the authorization request being said first result if not,
and wherein said first communication module is configured so as to send, to said server, said response to said authorization request.

According to one particular feature, the analysis module of the control device is configured so as to determine whether a predefined set of at least one usage rule for said delegation token is complied with.

The control device benefits from the same abovementioned advantages as the control method.

The invention also relates to a computer program product comprising instructions for implementing a control method such as described above when this program is executed by a processor.

The invention thus relates to software or a program, able to be executed by a computer or by a data processor, this software/program including instructions for commanding the execution of the steps of a control method. These instructions are intended to be stored in a memory of a computer device, loaded and then executed by a processor of this computer device.

This software/program may use any programming language, and be in the form of source code, object code, or of intermediate code between source code and object code, such as in a partially compiled form, or in any other desirable form.

The computer device may be implemented by one or more physically separate machines and has the overall architecture of a computer, including components of such an architecture: data memory(ies), processor(s), communication bus (es), hardware interface(s) for connecting this computer device to a network or another apparatus, user interface(s), etc.

The invention also relates to an information medium able to be read by a data processor and including program instructions, such as mentioned above. The information medium may be any entity or device capable of storing the program.

BRIEF DESCRIPTION OF THE DRAWINGS

Other particular features and advantages of the present invention will become apparent in the following description of embodiments, given by way of non-limiting example, with reference to the appended drawings, in which.

DETAILED DESCRIPTION OF ILLUSTRATIVE EMBODIMENTS

The invention is implemented by means of software and/or hardware components. In this regard, the term "module" may correspond in this document equally to a software component, to a hardware component or to a set of hardware and/or software components, able to implement a function or a set of functions, according to what is described below in respect of the module in question.

A software component corresponds to one or more computer programs, one or more subroutines of a program, or more generally to any element of a program or of software. Such a software component is stored in memory and then loaded and executed by a data processor of a physical entity (terminal, server, gateway, set-top box, router, etc.), and is able to access the hardware resources of this physical entity (memories, recording media, communication buses, electronic input/output cards, user interfaces, etc.).

In the same way, a hardware component corresponds to any element of a hardware assembly. This may be a programmable hardware component or one with an integrated processor for executing software, for example an integrated circuit, a chip card, an electronic card for executing firmware, etc.

Figure 3:
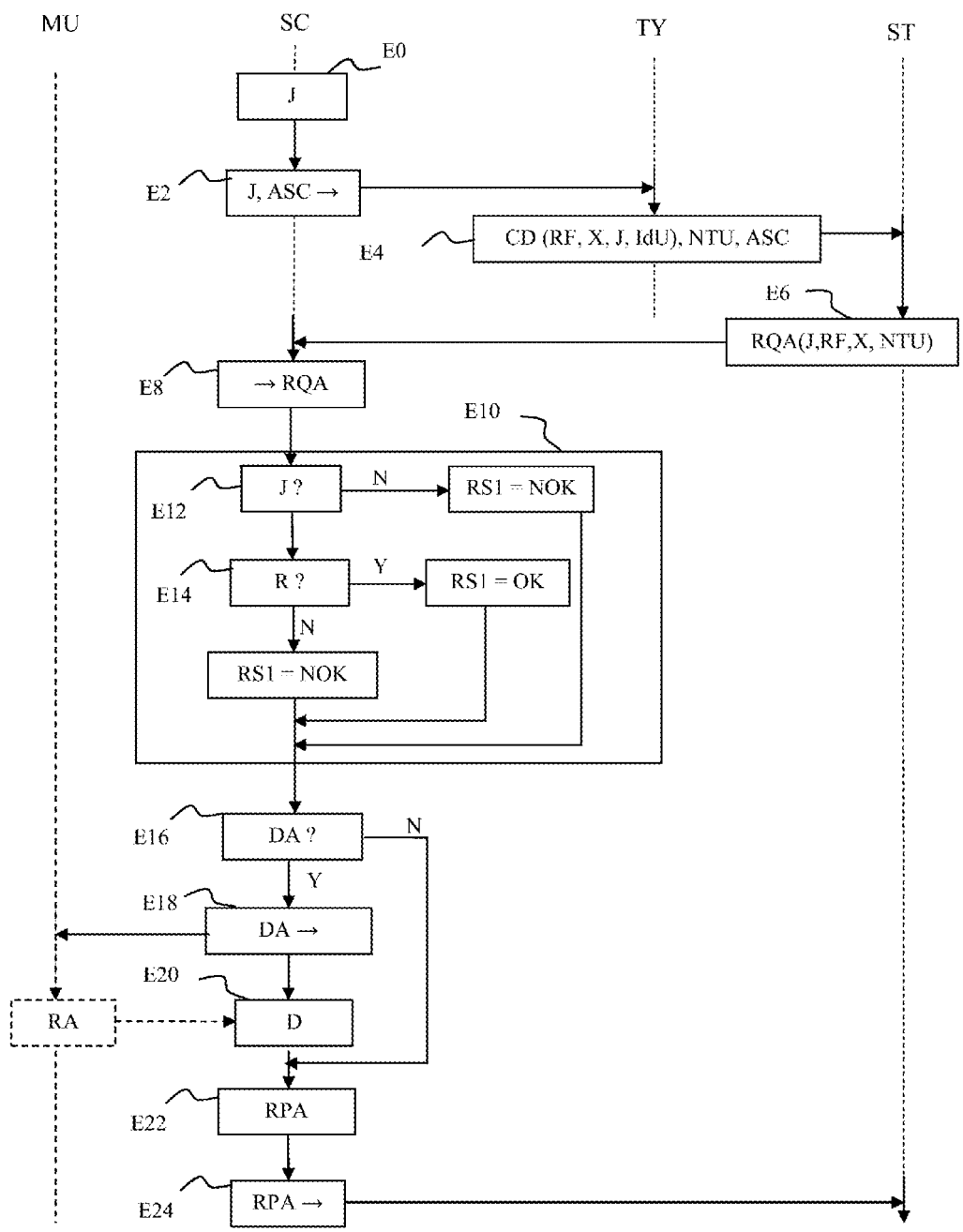
FIG. 3 is a flowchart illustrating the various steps of a control method according to a first embodiment of the invention.

A first embodiment of a control method will now be described with reference to FIGS. 1 to 3.

Figure 1:
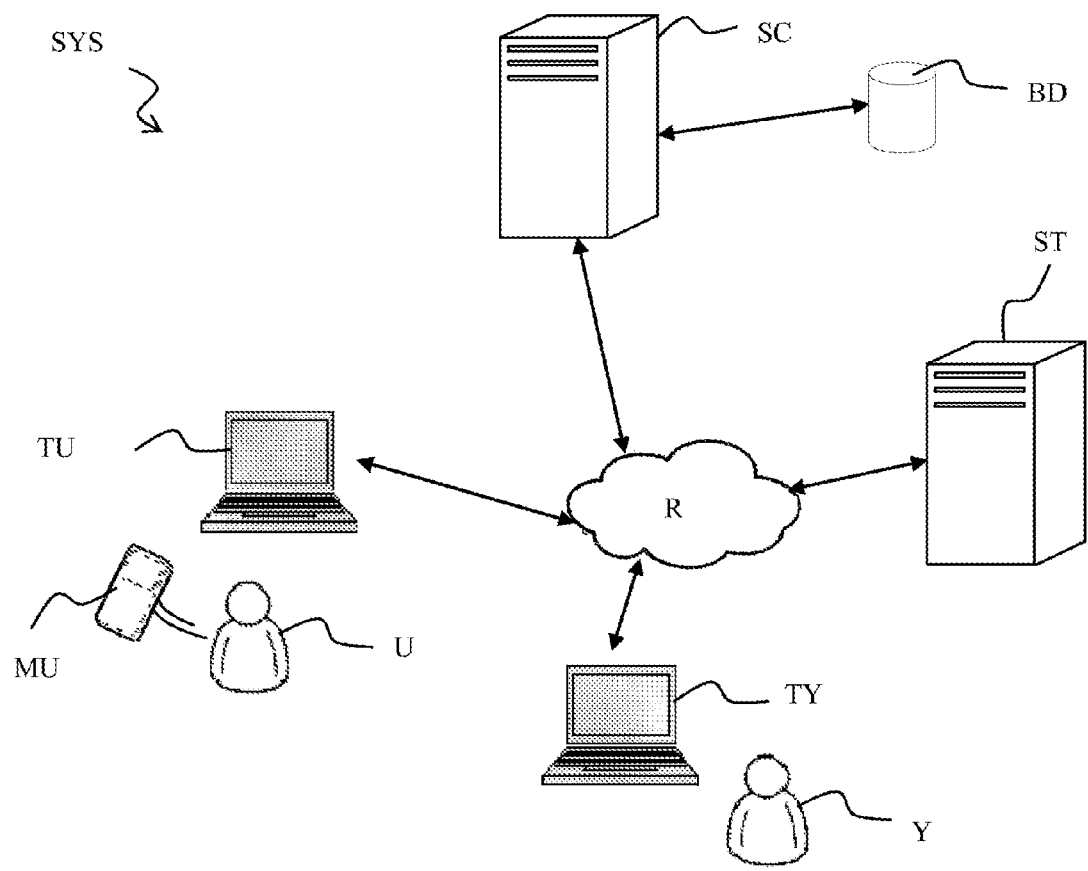
FIG. 1 is a diagram illustrating a system according to a first embodiment of the invention.

With reference to FIG. 1, a system SYS comprises a control server SC and a processing server ST that are able to communicate with one another via a communication network R.

A terminal TU of a user U is able to connect to the communication network R and to communicate with one or more servers via the network R.

A terminal TY of a user Y is able to connect to the communication network R and to communicate with one or more servers via the network R.

The terminal TY is for example able to connect to the processing server ST, for example via a website.

Typically, the terminals TU and TY include browsing software, commonly called a browser, allowing access to servers using Web technology.

The network R is the Internet.

As an alternative, the network R is an Intranet, a local area network, a wireless network of Wi-Fi or Bluetooth type, etc.

The terminal TU and the terminal TY are for example PCs ("personal computers").

As an alternative, the terminal TY and/or the terminal TU is a mobile telephone or a PDA ("personal digital assistant"). More generally, the terminals TY and TU are terminals that are able to access the network R.

The system SYS also includes a database BD accessible to the control server SC, directly or via the communication network R.

The control server SC represents one example of a control device within the meaning of the invention.

As an alternative, the control device is integrated into the control server SC. In other words, the control device is then a module of the control server SC.

As illustrated in FIG. 1, the user U also has a mobile terminal MU associated with the user U.

Figure 2:
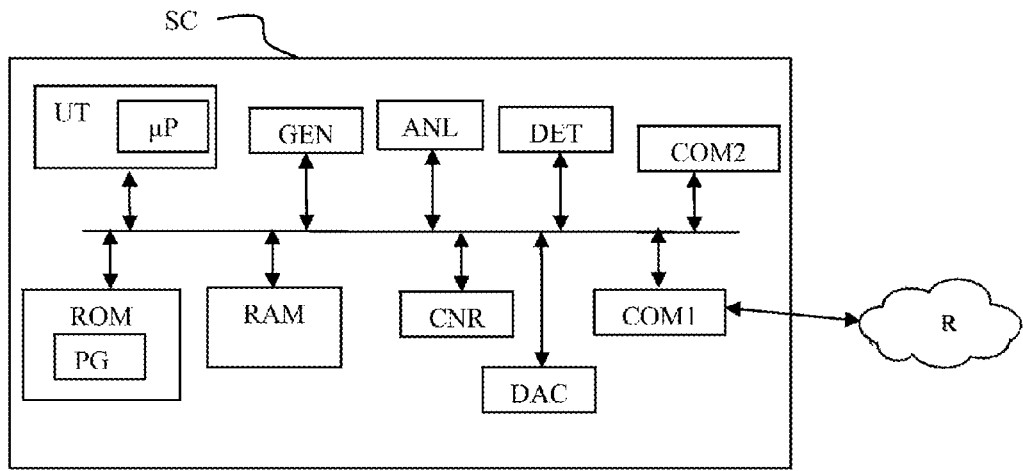
FIG. 2 is a diagram showing a control server able to implement a control method according to one embodiment of the invention.

With reference to FIG. 2, the control server SC includes, as is known, in particular a processing unit UT equipped with a microprocessor, a read-only memory (ROM) and a random access memory (RAM).

The read-only memory (ROM) contains registers storing a computer program PG including program instructions designed to implement a control method according to one embodiment of the invention that is described later on with reference to FIG. 3.

The control server SC also includes a first communication module COM1, a generation module GEN, an analysis module ANL, a determination module DET, a consent request module DAC, a response construction module CNR and a second communication module COM2.

The first communication module COM1 is configured so as to communicate via the network R. The first communication module COM1 is thus configured so as to communicate with the processing server ST.

The second communication module COM2 is configured so as to communicate via a second network. The second communication module COM2 is for example configured so as to transmit and receive SMSs (for "short message service") to or from terminals, for example from the mobile terminal MU of the user U.

In this embodiment, the second network is different from the network R.

As an alternative, the second network is the network R.

One embodiment of a control method, implemented in the system SYS, will now be described with reference to FIG. 3.

In the embodiment described, the processing server ST is an online sales server with which the user U is registered and thus has rights DR.

The rights DR are for example a login/password pair, an identifier, a bank account reference, etc.

There is no limit attached to the type of rights acquired by the user U.

In a preliminary step E0, the generation module GEN of the control server SC generates a delegation token J.

The generation of the delegation token J by the control server SC is triggered following the reception, by the control server SC, of a delegation request DD transmitted by the user U, for example via his terminal TU.

The delegation request DD includes data for defining the rights DR, that is to say the action or actions delegated by the user U.

The delegation request DD includes data for identifying a second user, for example the user Y, to whom the user U wishes to delegate the rights DR. The data for identifying the user Y are typically an identifier of the user Y, such as for example a surname/first name pair, a business identifier, etc.

The delegation request DD also includes a set E of at least one usage rule.

For example, the set E comprises a usage rule R1, and the usage rule R1 is for example "the sum of an order placed by the user Y on behalf of the user U must be less than 20 euros".

The set E defines the perimeter within which the user U authorizes the user Y to perform actions on his behalf, for example transactions.

As an alternative, the delegation request DD does not comprise a set E. In this case, no rule is associated with the delegation.

The delegation token J contains an identifier IdU of the user U and an identifier IdY of the user Y.

The identifier IdU of the user U, respectively the identifier IdY of the user Y, is for example the name of the user, an identifier assigned to the user, for example within a business in which he works, a social security number, etc.

The delegation token J also contains the set E or an identifier of the set E.

As an alternative, the set E is not contained in the token J and are recorded by the control server SC in the database BD in association with the delegation token J.

As an alternative, the set E are stored in an internal memory of the control server SC.

As an alternative, the delegation token J also contains data M for contacting the user U.

The data M are for example an MSISDN (for "Mobile Station International Subscriber Directory Number") number, for example the MSISDN number of a terminal MU of the user U, a telephone number, an email address, etc.

The generation of a delegation token is a technique known to those skilled in the art and is not described here.

In a step E2, the control server SC transmits the delegation token J and contact data ASC of the control server SC to the second user Y.

The contact data ASC are data for contacting the control server SC. The contact data ASC are typically an address of the control server SC, for example an IP ("Internet Protocol") address.

The control server SC transmits for example the delegation token J and the contact data ASC via the communication network R, an SMS, an email, etc.

As an alternative, the delegation token J and the contact data ASC are transmitted to the user U at the origin of the delegation request, and the user U takes responsibility for transmitting these data to the user Y.

There is no limit attached either to the transmission of the delegation token J or to the transmission of the contact data ASC of the control server SC to the user Y.

Subsequently, in a step E4, the user Y establishes a communication link, via the network R, between the terminal TY and the processing server ST, and then commands an action on behalf of the user U.

More precisely, the terminal TY sends a command CD to perform an action A1. The action A1 is for example the purchase of an object and the command CD contains a reference number RF of the object and a price X.

The terminal TY also sends a telephone number NTU of the user U, for example the telephone number associated with the mobile terminal MU, to the processing server ST.

The telephone number NTU is for example input by the user Y by way of a graphical interface displayed on a screen of the terminal TY.

The telephone number NTU represents a reachability identifier within the meaning of the invention.

The terminal TY also sends data indicating that the command CD has been performed on behalf of the user U, typically an identifier of the user U, to the processing server ST.

As an alternative, as an identifier of the user U is contained in the token J, the terminal TY does not indicate that the command CD is on behalf of the user U.

The terminal TY also transmits, to the processing server ST, the delegation token J and the contact data ASC of the control server SC.

Step E4 is followed by a step E6 in which the processing server ST, having received the data transmitted by the terminal TY in step E4, transmits, to the control server SC, using the contact data ASC, an authorization request RQA containing the token J and all or part of the command CD.

In the embodiment described here, the request RQA contains the token J, the reference number RF, the price X and the reachability identifier NTU.

The authorization request RQA is received by the first communication module COM1 from the control server SC in a step E8.

Step E8 is followed by a step E10 in which the analysis module ANL of the control server SC analyzes the request RQA and determines, on the basis of the data received in the request RQA and in particular of the token J, a first result RS1.

In the embodiment described, step E10 comprises two sub-steps E12 and E14.

In sub-step E12, the analysis module ANL of the control server SC verifies whether the delegation token J is a valid token.

If the delegation token J is not valid, for example a delegation token not generated by the control server SC, the first result RS1 is "denied" or "token not valid" or "NOK".

If the token J is valid, sub-step E12 is followed by sub-step E14 in which the analysis module ANL of the control server SC determines whether the rules of the set E are complied with.

Thus, in the exemplary embodiment described, in sub-step E14, the control server SC verifies that the price X is less than 20 euros.

If the set E of rules is complied with, the first result RS1 is "consent" or "OK". If not, the first result RS1 is "denied" or "NOK".

Step E10 is followed by a step E16 in which the determination module DET of the control server SC determines whether consent of the user U should be requested.

In the embodiment described, this consent is requested if the set E of rules is not complied with, for example if the price X is higher than 20 euros.

As an alternative, consent is automatically requested if the token J is a valid token.

Also, as an alternative, consent is requested if firstly the set E of rules is not complied with, and if secondly an additional rule, recorded for example in a memory of the control server SC or of the database BD, is complied with. For example, consent is requested if the price is higher than €20 but less than €30.

If it is determined that user consent should be requested, step E16 is followed by a step E18 in which the consent request module DAC of the control server SC sends, to the user U, via the second communication module COM2, a consent request DA for the execution of the action A1, using the telephone number NTU contained in the request RQA.

The consent request DA is for example an SMS and contains for example the text: "user Y has requested the execution of an order for an object with reference RF for a sum of €22. Do you consent to this order?".

As an alternative, this consent request DA is transmitted by another communication means, for example an email, a voice message, etc.

Step E18 is followed by a step E20 during which the control server SC awaits a response to the consent request DA for a predefined maximum period D.

Following the reception of a response RA to the consent request DA or at the end of the predefined period D, the response construction module CNR of the control server SC constructs a response RPA to the authorization request RQA (step E22).

The response RPA signals consent or denial for the execution of the command CD.

The response RPA is determined on the basis of the response RA of the user U to the consent request DA. The response RA to the consent request DA is formulated by the user U and transmitted to the control server SC by the terminal MU in the form for example of an SMS. It is received by the control server SC via the second communication module COM2.

If it is determined that the response RA to the consent request DA is consent or denial for the action A1, the response RPA to the authorization request RQA signals said consent or said denial.

If no response is received within the predefined period D or if the response RA received from the terminal MU does not contain consent or denial, the response RPA contains the first determined result RS1.

If it is determined in step E16 that user consent should not be requested, the response RPA contains the first result RS1 determined in step E10.

Step E22 is followed by a step E24 in which the first communication module COM1 of the control server SC sends the response RPA to the processing server ST.

The processing server ST then continues processing the command CD depending on the received response RPA.

Steps E0, E2, E8, E10, E16, E18, E20, E22 and E24 implemented by the control server SC represent steps of a control method.

In the embodiment described, the action A1 is an online order.

The invention also applies to other types of action. For example, the action is validation of a leave request to a leave management server. For example, the user Y is authorized by the user U to validate the requested leave, as long as the leave requested over the course of the current month does not exceed fifteen days. If the leave requested over the course of the current month exceeds fifteen days, a consent request is transmitted to the user U.

A second embodiment of a control method will now be described with reference to FIGS. 4 and 5.

Figure 4:
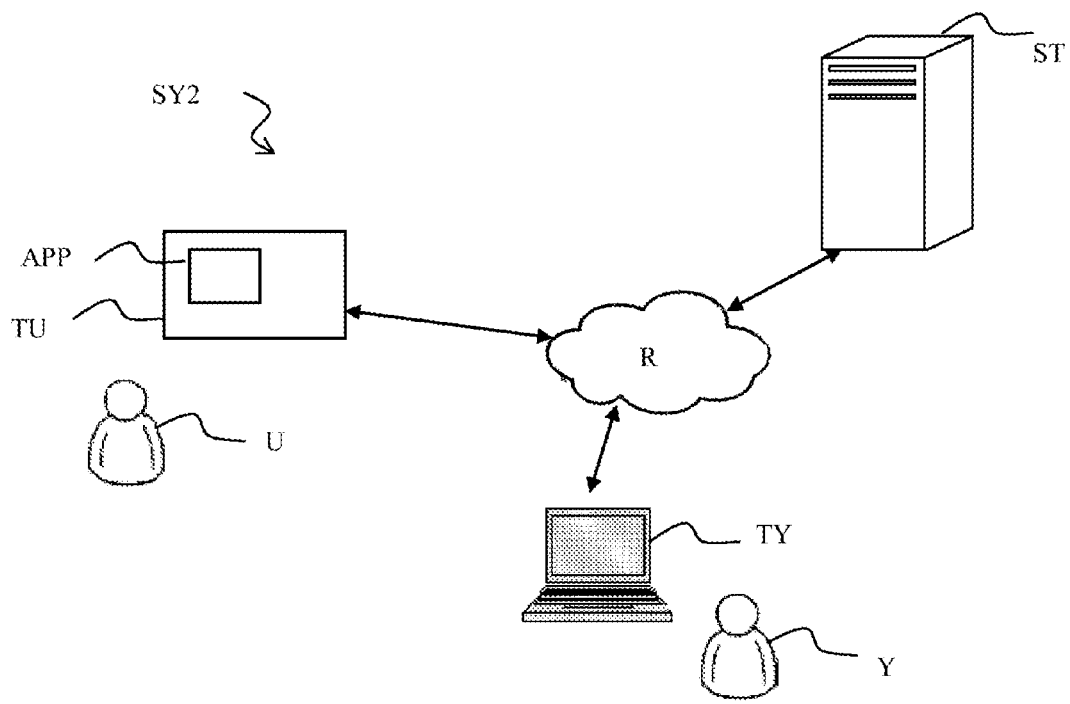
FIG. 4 is a diagram illustrating a system according to a second embodiment of the invention.
Figure 5:
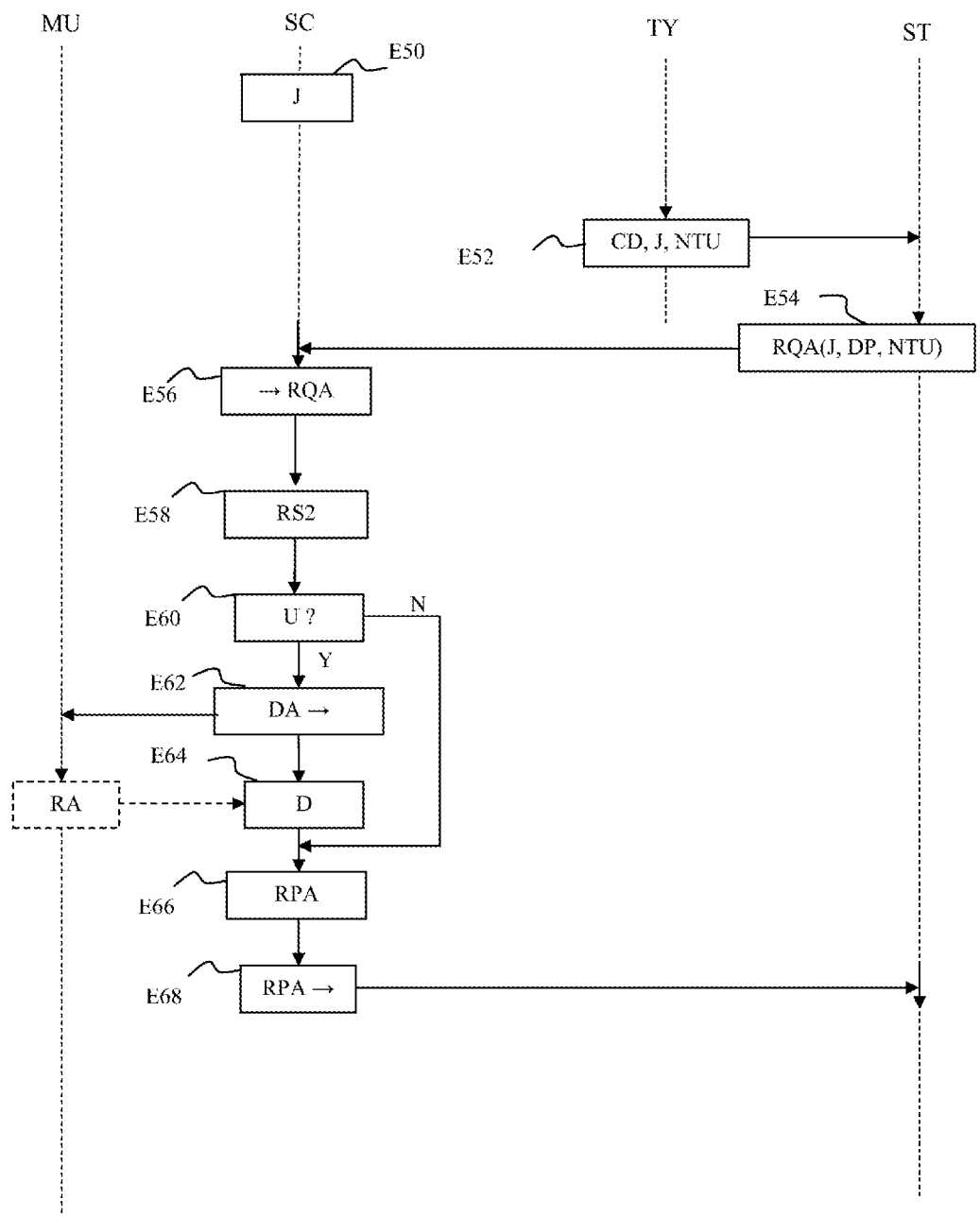
FIG. 5 is a flowchart illustrating the various steps of a control method according to a second embodiment of the invention.

With reference to FIG. 4, a system SY2 comprises a processing server ST, a terminal TU of a first user U and a terminal TY of a second user Y that are able to communicate with one another via a communication network R.

The terminal TU and the terminal TY are able to connect to the communication network R and to communicate with one another, on the one hand, and with one or more servers via the network R, on the other hand.

The network R is the Internet, for example.

The terminal TU and the terminal TY are for example PCs ("personal computers").

As an alternative, the terminal TY and/or the terminal TU is a mobile telephone or a PDA ("personal digital assistant").

An application APP has been loaded beforehand in the terminal TU.

The application APP represents one example of a control device within the meaning of the invention.

One embodiment of a control method, implemented in the system SY2, will now be described with reference to FIG. 5.

In the embodiment described, the processing server ST is a server for managing trips for employees in a business with which the user U is registered and thus has rights to validate trips for a predefined list of employees, for example the employees in his team.

In a preliminary step E50, the user U, by way of an interface of the application APP installed on the terminal TU, requests that the user Y be able to validate trips in France for the members of his team.

Following the reception of this request, the application APP generates a delegation token J. The token J certifies that the user Y has delegation rights given by the user U in order to manage trips for the employees in the team of A.

The application APP also records, in a memory of the terminal TU of the user U, a rule R2: "the destination for the trip must be in France".

The application APP records an identifier of the user U, an identifier of the user Y and the token J in association with the rule R2.

The application APP communicates the token J to the user U, who relays it to the user Y.

There is no limit attached to the way in which the token is transmitted to the user U.

In a step E52, the user Y establishes a communication link, via the network R, between the terminal TY and the processing server ST, and commands validation of a trip to Germany for an employee in the team of the user U.

More precisely, the terminal TY sends a validation command CD. The validation of the trip represents an action, referenced A2, within the meaning of the invention.

The terminal TY also transmits the delegation token J and a mobile telephone number NTU of the user U to the processing server ST.

Step E52 is followed by a step E54 in which the processing server ST, having received the data transmitted by the terminal TY in step E52, transmits an authorization request RQA containing the token J, the telephone number NTU and data DP in relation to the command CD to the application APP.

In the embodiment described here, the data DP in relation to the command and contained in the request RQA are an identifier IdZ of the employee Z wishing to take a trip, for example his name and the destination of the trip.

The authorization request RQA is received by the application APP in a step E56.

Step E56 is followed by a step E58 in which the application APP analyzes the received request RQA.

In particular, the application APP recovers, from its memory, the token J and the data recorded in association with the token J, and uses these data to verify the validity of the token J and to verify whether the rule R2 is complied with.

The application APP thus determines a first result RS2 signaling denial, because the rule R2 is not complied with.

In a step E60, the application APP determines that, the rule R2 being not complied with, consent of the user U should be requested.

Step E60 is followed by a step E62 in which the application APP transmits, to the user U, using the telephone number NTU contained in the authorization request RQA, a consent request DA for the execution of the action A2.

The consent request DA is for example an SMS and contains for example the text: "Do you consent to user Y validating a trip to Germany for employee Z?".

Step E62 is followed by a step E64 during which the application APP awaits a response to the consent request DA for a predefined maximum period D.

Following the reception of a response RA to the consent request DA or at the end of the predefined period D, the application APP constructs a response RPA to the authorization request RQA (step E66).

The response RPA signals consent or denial for the execution of the action A2.

The response RPA is determined on the basis of the response of the user U to the consent request DA.

If a response RA to the consent request DA is received by the application APP and it is determined that the response RA contains consent or denial for the action A2, the response RPA to the authorization request RQA is determined on the basis of the response RA, and the response RPA to the authorization request RQA signals said consent or said denial.

If no response is received within the predefined period, the response RPA contains the first result RS2 determined in the analysis step E56.

If a response RA to the consent request DA is received by the application APP but the application is not able to determine whether the response RA contains consent or denial for the action A2, the response RPA contains the first determined result RS2.

Step E66 is followed by a step E68 in which the control server SC sends the response RPA to the processing server ST.

In the embodiments described, the delegation token is transmitted to a terminal of a user.

As an alternative, the delegation token J is transmitted to a connected object able to command the performance of an action.

Such a connected object is for example an object installed in a refrigerator and configured so as to establish a grocery list on the basis of the products stored in this fridge. An action is for example a purchase request. The purchase request is for example formulated periodically by the connected object or triggered when the shelves of the refrigerator are almost empty.

In the embodiments described, the reachability identifier is transmitted by the terminal TY to the processing server ST and inserted by this processing server into the authorization request RQA.

As an alternative, the reachability identifier is contained in the delegation token J or recorded by the control device in a memory accessible to this control device.

There is no limit attached to the type of rules. According to one embodiment, one or more rules are defined for a usage context.

By way of example, a first rule may limit the number of actions performed by a connected object of refrigerator type to one command per week if the average outdoor temperature is lower than 25° C. and allow a higher number of commands if the average outdoor temperature is higher than 25° C.

By way of second example, the usage context associated with a rule may be linked to the location of the second user. In this case, the control server includes means for obtaining an item of location information on the second user. The authorization request includes for example an item of information on the location of the second user, or the control server includes means for interrogating a device able to provide this item of location information.

Although the present disclosure has been described with reference to one or more examples, workers skilled in the art will recognize that changes may be made in form and detail without departing from the scope of the disclosure and/or the appended claims.

The invention claimed is:

1. A method for controlling at least one action, comprising the following acts implemented by a control device:
   receiving, from a server, an authorization request in relation to at least one action for which a first user has execution rights and for which a command has been formulated by a terminal of a second user, said request containing data in relation to said at least one action and a delegation token certifying delegation of said at least one action by the first user to the second user,
   analyzing said request on the basis of the token so as to determine a first result;
   determining, on the basis of said first result, whether consent of the first user should be requested for execution of said at least one action;
   sending, to a terminal of said first user, a consent request for execution of said at least one action, in response to determining that consent of the first user should be requested; and
   receiving, from the terminal of the said first user, a response to the consent request for the execution of said at least one action formulated by the said first user;
   sending, to said server, a response to said authorization request signalling denial or consent for said at least one action, said response to the authorization request being obtained on the basis of the response to the consent request if the response to the consent request containing consent or denial is obtained by said device within a predetermined period or said response to the authorization request being said first result if not.

2. The method as claimed in claim 1, wherein the analyzing includes a verification step for determining whether a predefined set of at least one usage rule for said delegation token is complied with, and wherein the sending a consent request is performed if said set of rules is not complied with.

3. The method as claimed in claim 1, wherein the authorization request and the response to the authorization request are transmitted via a first communication network and wherein the consent request is transmitted via a second communication network.

4. The method as claimed in claim 1, wherein said authorization request includes a reachability identifier of the first user used to transmit said consent request.

5. The method as claimed in claim 1, wherein said consent request is transmitted in the form of an SMS ("short message service") message.

6. The method as claimed in claim 1, wherein at least one rule of said set is a rule associated with a usage context.

7. A control device comprising:
   a processor; and
   a non-transitory computer-readable medium comprising instructions stored thereon, which when executed by the processor configure the control device to:
   receive, from a server, an authorization request in relation to at least one action for which a first user has execution rights and for which a command has been formulated by a terminal of a second user, said request containing data in relation to said at least one action, a delegation token certifying delegation of said at least one action by the first user to the second user,
   analyze said request on the basis of the token so as to determine a first result;
   determine, on the basis of said first result, whether consent of the first user should be requested for execution of said at least one action;
   send, to a terminal of said first user, a consent request for the execution of said at least one action, in response to determining that consent of the first user should be requested;
   receiving, from the terminal of the said first user, a response to the consent request for the execution of said at least one action formulated by the said first user;
   construct a response to said authorization request signalling denial or consent for said at least one action, said response to the authorization request being obtained on the basis of the response to the consent request if the response to the consent request containing consent or denial is obtained by said device within a predetermined period or said response to the authorization request being said first result if not,
   send, to said server, said response to said authorization request.

8. The device as claimed in claim 7, wherein the analysis module is configured so as to determine whether a predefined set of at least one usage rule for said delegation token is complied with.

9. A non-transitory computer-readable recording medium on which there is recorded a computer program including program code instructions for executing a method of controlling at least one action, when the instructions are execute by a processor of a control device, wherein the instructions configure the control device to:
   receive, from a server, an authorization request in relation to at least one action for which a first user has execution rights and for which a command has been formulated by a terminal of a second user, said request containing data in relation to said at least one action and a delegation token certifying delegation of said at least one action by the first user to the second user,
   analyze said request on the basis of the token so as to determine a first result;
   determine, on the basis of said first result, whether consent of the first user should be requested for execution of said at least one action;

send, to a terminal of said first user, a consent request for execution of said at least one action, in response to determining that consent of the first user should be requested; and receiving, from the terminal of the said first user, a response to the consent request for the execution of said at least one action formulated by the said first user;

send, to said server, a response to said authorization request signalling denial or consent for said at least one action, said response to the authorization request being obtained on the basis of the response to the consent request if the response to the consent request containing consent or denial is obtained by said device within a predetermined period or said response to the authorization request being said first result if not.

* * * * *